United States Patent
Jung

(10) Patent No.: US 9,912,194 B2
(45) Date of Patent: Mar. 6, 2018

(54) WIRELESS POWER APPARATUS AND OPERATION METHOD THEREOF

(75) Inventor: Woo Kil Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 913 days.

(21) Appl. No.: 14/343,990

(22) PCT Filed: Aug. 13, 2012

(86) PCT No.: PCT/KR2012/006450
§ 371 (c)(1),
(2), (4) Date: May 13, 2014

(87) PCT Pub. No.: WO2013/035987
PCT Pub. Date: Mar. 14, 2013

(65) Prior Publication Data
US 2014/0292099 A1   Oct. 2, 2014

(30) Foreign Application Priority Data
Sep. 9, 2011  (KR) ........................ 10-2011-0092014

(51) Int. Cl.
*H02J 17/00* (2006.01)
*H02J 5/00* (2016.01)
*H02J 50/12* (2016.01)
*H02J 7/02* (2016.01)

(52) U.S. Cl.
CPC .............. *H02J 17/00* (2013.01); *H02J 5/005* (2013.01); *H02J 50/12* (2016.02); *H02J 7/025* (2013.01)

(58) Field of Classification Search
CPC ............. H02J 17/00; H02J 5/005; H02J 50/10
See application file for complete search history.

(56) References Cited

U.S. PATENT DOCUMENTS

| | | |
|---|---|---|
| 2010/0201189 A1 | 8/2010 | Kirby et al. |
| 2010/0201201 A1 | 8/2010 | Mobarhan et al. |

(Continued)

FOREIGN PATENT DOCUMENTS

| | | |
|---|---|---|
| JP | 2004-080844 A | 3/2004 |
| JP | 2010-154592 A | 7/2010 |
| JP | 2011-147280 A | 7/2011 |
| KR | 10-2006-0005537 A | 1/2006 |
| WO | WO-2010-093721 A1 | 8/2010 |

OTHER PUBLICATIONS

International Search Report in International Application No. PCT/KR2012/006450, filed Aug. 13, 2012.

(Continued)

Primary Examiner — Jared Fureman
Assistant Examiner — Emmanuel R Dominique
(74) Attorney, Agent, or Firm — Saliwanchik, Lloyd & Eisenschenk

(57) ABSTRACT

Disclosed is a wireless power apparatus to repeat power between a wireless power transmitter and a wireless power receiver. The wireless power apparatus includes a resonant coil resonance-coupled with the wireless power transmitter to wirelessly repeat the power, an induction coil for transferring, to a load, a power generated through coupling the induction coil with the resonant coil and a detecting unit for detecting an existence of the wireless power receiver, wherein the wireless power apparatus operates in one mode of a power reception and a power repeat mode according to a result of a detection of the wireless power receiver, wherein the power reception mode is supplying the power to the load and the power repeat mode is transferring the power the wire-less power receiver.

6 Claims, 3 Drawing Sheets

(56) References Cited

U.S. PATENT DOCUMENTS

| | | | |
|---|---|---|---|
| 2010/0201314 A1* | 8/2010 | Toncich | H02J 7/025 320/108 |
| 2011/0115430 A1* | 5/2011 | Saunamaki | H02J 5/005 320/108 |
| 2011/0133569 A1 | 6/2011 | Cheon et al. | |
| 2011/0169446 A1* | 7/2011 | Kondo | H01M 10/4257 320/108 |
| 2011/0175455 A1 | 7/2011 | Hashiguchi | |
| 2011/0175456 A1 | 7/2011 | Kozakai | |
| 2012/0001497 A1* | 1/2012 | Sada | H02J 5/005 307/104 |
| 2013/0049484 A1* | 2/2013 | Weissentern | H02J 5/005 307/104 |
| 2013/0200721 A1* | 8/2013 | Kurs | H04B 5/0037 307/104 |

OTHER PUBLICATIONS

Notice of Allowance dated Jan. 23, 2013 in Korean Application No. 10-2011-0092014.
European Search Report in European Application No. 12830694.1, dated Apr. 20, 2015.

* cited by examiner

[Fig. 1]
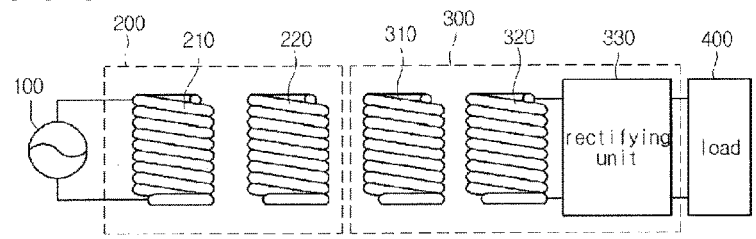
[Fig. 2]
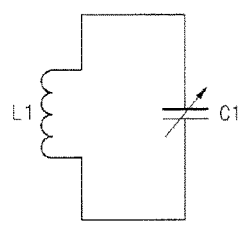
[Fig. 3]
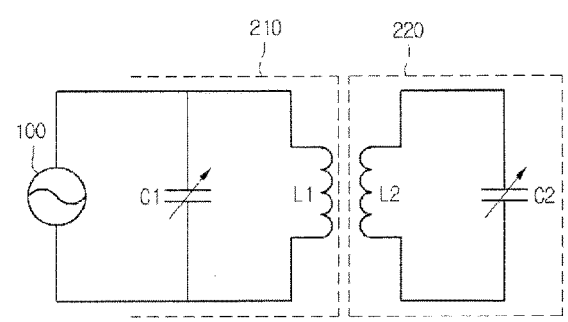
[Fig. 4]
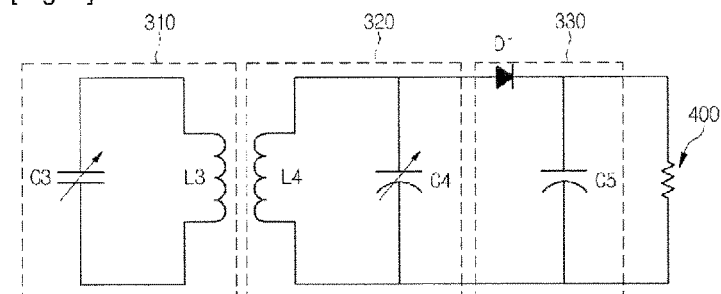
[Fig. 5]
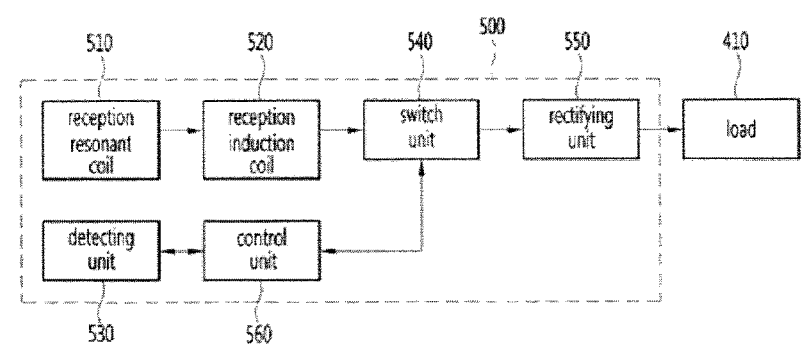

[Fig. 6]
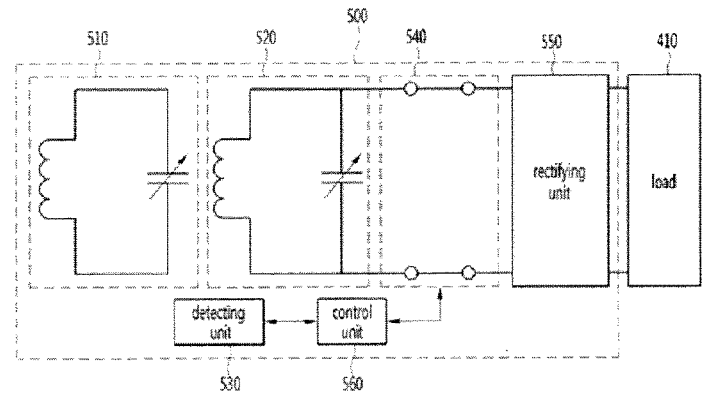
[Fig. 7]
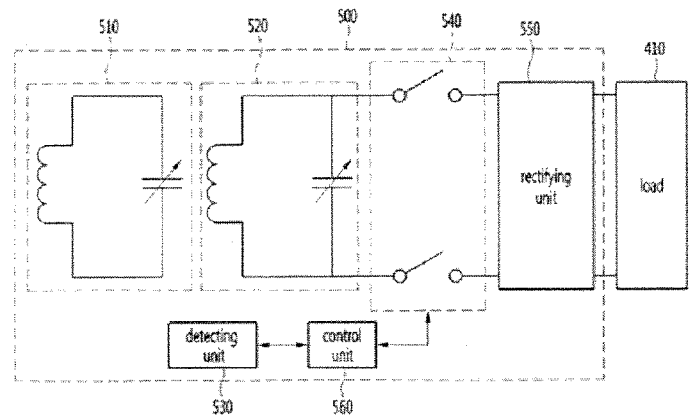
[Fig. 8]
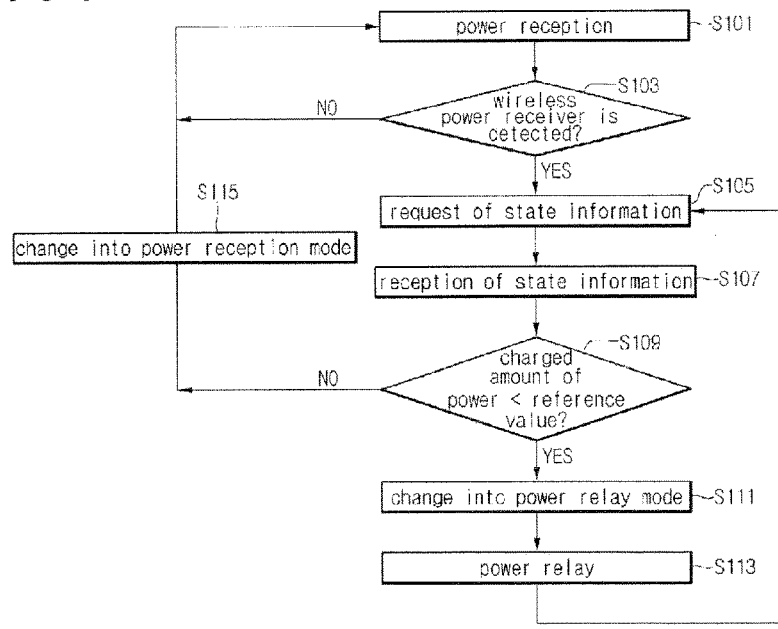

WIRELESS POWER APPARATUS AND OPERATION METHOD THEREOF

CROSS-REFERENCE TO RELATED APPLICATIONS

This application is the U.S. national stage application of International Patent Application No. PCT/KR2012/006450, filed Aug. 13, 2012, which claims priority to Korean Application No. 10-2011-0092014, filed Sep. 9, 2011, the disclosures of each of which are incorporated herein by reference in their entirety.

TECHNICAL FIELD

The disclosure relates to a wireless power transmission apparatus and an operation method thereof. In more particular, the disclosure relates to a wireless power apparatus capable of converting a power transmission path according to an approach of a receiver in wireless power transmission using resonance and an operation method thereof.

BACKGROUND ART

A wireless power transmission or a wireless energy transfer refers to a technology for wirelessly transferring electric energy to desired devices. In the 1800's, an electric motor or a transformer employing the principle of electromagnetic induction has been extensively used and then a method for transmitting electric energy by irradiating electromagnetic waves, such as radio waves or lasers, has been suggested. Actually, electric toothbrushes or electric razors, which are frequently used in daily life, are charged based on the principle of electromagnetic induction. Until now, the long-distance transmission using the magnetic induction, the resonance and the short-wavelength radio frequency has been used as the wireless energy transfer scheme.

The wireless power transmission using the resonance, which has been actively studied in these days, can obtain the high power transmission efficiency in a distance of several meters as compared with the magnetic induction scheme. According to the wireless power transmission, a resonant coil generating resonance is included in each of a transmission unit and a receiving unit and the high-efficiency transmission is possible when resonance frequencies of two resonant coils exactly match with each other.

DISCLOSURE OF INVENTION

Technical Problem

An object of the disclosure is to provide a wireless power apparatus capable of lengthening a wireless power transmission distance and repeating power to other receivers and an operation method thereof.

Another object of the disclosure is to provide a wireless power apparatus capable of changing an operation mode according to a result of a detection of a wireless power receiver and an operation method thereof.

Still another object of the disclosure is to provide a wireless power apparatus capable of changing an operation mode according to a result of a detection and state information of a wireless power receiver and an operation method thereof.

Still another object of the disclosure is to provide a wireless power apparatus capable of changing an operation mode according to a result of a detection of a wireless power receiver to prevent high-voltage electricity from being concentrated in a wireless power transmitter and a wireless power repeater and an operation method thereof.

Solution to Problem

According to one embodiment of the disclosure, there is provided a wireless power apparatus to repeat power between a wireless power transmitter and a wireless power receiver. The wireless power apparatus includes a resonant coil resonance-coupled with the wireless power transmitter to wirelessly repeat the power, an induction coil for transferring, to a load, a power generated through coupling the induction coil with the resonant coil and a detecting unit for detecting an existence of the wireless power receiver, wherein the wireless power apparatus operates in one mode of a power reception and a power repeat mode according to a result of a detection of the wireless power receiver, wherein the power reception mode is supplying the power to the load and the power repeat mode is transferring the power the wireless power receiver.

According to one embodiment of the disclosure, there is provided a method of operating a wireless power apparatus to repeat power between a wireless power transmitter and a wireless power receiver. The method includes the steps of wirelessly receiving the power from the wireless power transmitter using resonance, detecting an existence of the wireless power receiver; and changing an operation mode of the wireless power apparatus according to a detection result for the wireless power receiver.

Advantageous Effects of Invention

As described above, according to the embodiments of the disclosure, power can be transmitted to an electronic appliance located far away, and undesired power consumption can be prevented, so that the power can be efficiently used.

In addition, the wireless power apparatus according to the embodiment of the disclosure can transmit the power to other receivers while receiving wireless power, so that the efficient power transmission is possible.

BRIEF DESCRIPTION OF DRAWINGS

FIG. 1 is a view showing a wireless power transmission system according to one embodiment of the disclosure;

FIG. 2 is a circuit diagram showing an equivalent circuit of a transmission induction coil according to one embodiment of the disclosure;

FIG. 3 is a circuit diagram showing an equivalent circuit of a power supply apparatus and a wireless power transmitter according to one embodiment of the disclosure;

FIG. 4 is a circuit diagram showing an equivalent circuit of a wireless power receiver according to one embodiment of the disclosure;

FIG. 5 is a block view showing a wireless power apparatus according to one embodiment of the disclosure;

FIG. 6 is a view showing a power reception mode of a wireless power apparatus according to one embodiment of the disclosure;

FIG. 7 is a view showing a power repeat mode of a wireless power apparatus according to one embodiment of the disclosure;

FIG. 8 is a flowchart showing an operation method of a wireless power apparatus according to one embodiment of the disclosure.

BEST MODE FOR CARRYING OUT THE INVENTION

Figure 9:
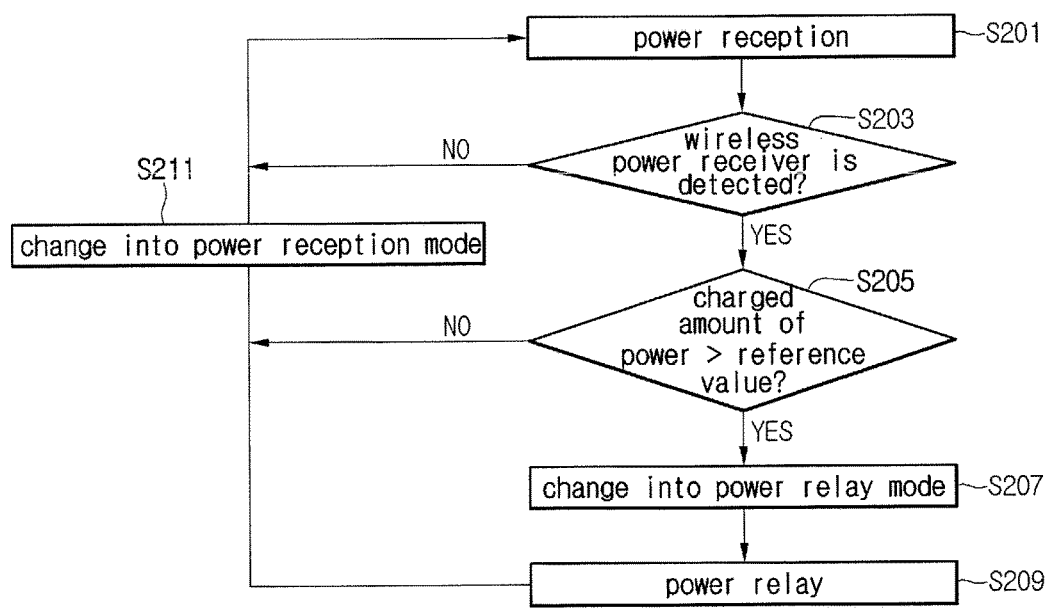
FIG. 9 is a flowchart showing an operation method of a wireless power apparatus according to another embodiment of the disclosure.

Hereinafter, embodiments will be described in detail with reference to accompanying drawings so that those skilled in the art can easily work with the embodiments.

FIG. 1 is a view showing a wireless power transmission system according to one embodiment of the disclosure.

Referring to FIG. 1, the wireless power transmission system may include a power supply apparatus 100, a wireless power transmitter 200, a wireless power receiver 300, and a load 400.

According to one embodiment, the power supply apparatus 100 may be included in the wireless power transmitter 200.

The wireless power transmitter 200 may include a transmission induction coil 210 and a transmission resonant coil 220.

The wireless power receiver 300 may include a reception resonant coil, a reception induction coil 320, a rectifying unit 330, and the load 400.

Both terminals of the power supply apparatus 100 are connected to both terminals of the transmission induction coil 210.

The transmission resonant coil 220 may be placed apart from the transmission induction coil 210 by a predetermined distance.

The reception resonant coil 310 may be placed apart from the reception induction coil 320 by a predetermined distance.

Both terminals of the reception induction coil 320 are connected to both terminals of the rectifying unit 330, and the load 400 is connected to both terminals of the rectifying unit 330. According to one embodiment, the load 400 may be included in the wireless power receiver 300.

The power generated from the power supply apparatus 100 is transmitted to the wireless power transmitter 200. The power received in the wireless power transmitter 200 is transmitted to the wireless power receiver 300 that makes resonance with the wireless power transmitter 200 by a resonance phenomenon, that is, has the resonance frequency the same as that of the wireless power transmitter 200.

Hereinafter, the power transmission process will be described in more detail.

The power supply apparatus 100 generates AC power having a predetermined frequency and transmits the AC power to the wireless power transmitter 200.

The transmission induction coil 210 and the transmission resonant coil 220 are inductively coupled with each other. In other words, if AC current flows through the transmission induction coil 210 by the power received from the power supply apparatus 100, the AC current is induced to the transmission resonant coil 220 physically placed apart from the transmission induction coil 210 by the electro-magnetic induction.

Thereafter, the power received in the transmission resonant coil 220 is transmitted to the wireless power receiver 300 that makes a resonance circuit with the wireless power transmitter 200 using resonance.

Power can be transmitted between two LC circuits, which are impedance-matched with each other, using resonance. The power transmitted using the resonance can be father transmitted with higher efficiency when comparing with the power transmitted by the electromagnetic induction.

The reception resonant coil 310 receives power from the transmission resonant coil 220 using the resonance. The AC current flows through the reception resonant coil 310 by the received power. The power received in the reception resonant coil 310 is transmitted to the reception induction coil 320, which is inductively coupled with the reception resonant coil 310, by the electromagnetic induction. The power received in the reception induction coil 320 is rectified by the rectifying unit 330 and transmitted to the load 400.

The transmission resonant coil 220 of the wireless power transmitter 200 may transmit power to the reception resonant coil 310 of the wireless power receiver 300 through a magnetic field.

In detail, the transmission resonant coil 220 and the reception resonant coil 310 are resonance-coupled with each other so that the transmission resonant coil 220 and the reception resonant coil 310 operate at a resonance frequency.

The resonance-coupling between the transmission resonant coil 220 and the reception resonant coil 310 can significantly improve the power transmission efficiency between the wireless power transmitter 200 and the wireless power receiver 300.

A quality factor and a coupling coefficient are important in the wireless power transmission. In other words, the power transmission efficiency can be gradually improved as the values of the quality factor and the coupling coefficient are increased.

The quality factor may refer to an index of energy that may be stored in the vicinity of a wireless power transmitter or a wireless power receiver.

The quality factor may vary according to the operating frequency w as well as a shape, a dimension, and a material of a coil. The quality factor may be expressed as following equation, $Q=w*L/R$. In the above equation, L refers to the inductance of a coil, and R refers to resistance corresponding to the quantity of power loss caused in the coil.

The quality factor may have a value of 0 to infinity.

The coupling coefficient represents the degree of inductive coupling between a transmission coil and a reception coil, and has a value of 0 to 1.

The coupling coefficient may vary according to the relative position and the distance between the transmission coil and the reception coil.

FIG. 2 is a circuit diagram showing an equivalent circuit of the transmission induction coil 210 according to the one embodiment of the disclosure.

As shown in FIG. 2, the transmission induction coil 210 may include an inductor L1 and a capacitor C1, and a circuit having a desirable inductance and a desirable capacitance can be constructed by the inductor L1 and the capacitor C1.

The transmission induction coil 210 may be constructed as an equivalent circuit in which both terminals of the inductor L1 are connected to both terminals of the capacitor C1. In other words, the transmission induction coil 210 may be constructed as an equivalent circuit in which the inductor L1 is connected to the capacitor C1 in parallel.

The capacitor C1 may include a variable capacitor, and impedance matching may be performed by adjusting the variable capacitor. The equivalent circuit of the transmission resonant coil 220, the reception resonant coil 310, and the reception induction coil 320 may be the same as those shown in FIG. 2.

FIG. 3 is a circuit diagram showing an equivalent circuit of the power supply apparatus 100 and the wireless power transmitter 200 according to one embodiment of the disclosure.

As shown in FIG. 3, the transmission induction coil 210 and the transmission resonant coil 220 may be constructed by using inductors L1 and L2 and capacitors C1 and C2 having predetermined inductances and capacitances, respectively.

FIG. 4 is a circuit diagram showing an equivalent circuit of the wireless power receiver 300 according to one embodiment of the disclosure.

As shown in FIG. 4, the reception resonant coil 310 and the reception induction coil 320 may be constructed by using inductors L3 and L4, and capacitors C3 and C4 having inductances and capacitances, respectively.

The rectifying unit 330 may be constructed by using a diode D1 and a rectifying capacitor C5 and may output DC power by converting AC power into the DC power.

The rectifying unit 330 may include a rectifier and a smoothing circuit. The rectifier may include a silicon rectifier as a rectifying element.

The smoothing circuit smoothes the output of the rectifier.

The load 400 may include a predetermined rechargeable battery or a device requiring the DC power. For example, the load 400 may refer to a battery.

The wireless power receiver 300 may be mounted on an electronic device, such as a cellular phone, a laptop computer, or a mouse, requiring the power.

The wireless power transmitter 200 may adjust the power transmitted to the wireless power receiver 300 through in-band communication with the wireless power receiver 300.

The in-band communication refers to communication for interchanging information between the wireless power transmitter 200 and the wireless power receiver 300 through a signal having a frequency used in wireless power transmission. The wireless power receiver 300 may receive or may not receive power transmitted from the wireless power transmitter 200 through a switching operation. Accordingly, the wireless power transmitter 200 detects the quantity of power consumed in the wireless power receiver 300 to recognize an on-signal or an off-signal of the wireless power receiver 300.

In detail, the wireless power receiver 300 may change the power consumption in the wireless power transmitter 200 by adjusting the quantity of power absorbed in a resistor by using the resistor and a switch. The wireless power transmitter 200 detects the variation of the power consumption to acquire the state information of the wireless power receiver 300. The switch may be connected to the resistor in series. According to one embodiment, the state information of the wireless power receiver 300 may include information about the present charge amount in the wireless power receiver 300 and the change of the charge amount.

In more detail, if the switch is open, the power absorbed in the resistor becomes zero, and the power consumed in the wireless power transmitter 200 is reduced.

If the switch is closed, the power absorbed in the resistor becomes greater than zero, and the power consumed in the wireless power transmitter 200 is increased. If the wireless power receiver repeats the above operation, the wireless power transmitter 200 detects power consumed therein to make digital communication with the wireless power receiver 300.

The wireless power transmitter 200 receives the state information of the wireless power receiver 300 through the above operation so that the wireless power transmitter 200 can transmit appropriate power.

In contrast, the wireless power transmitter 200 may include a resistor and a switch to transmit the state information of the wireless power transmitter 200 to the wireless power receiver 300. According to one embodiment, the state information of the wireless power transmitter 200 may include information about the maximum amount of power supplied from the wireless power transmitter 200, the number of wireless power receivers 300 receiving the power from the wireless power transmitter 200, and the amount of available power of the wireless power transmitter 200.

Hereinafter, the procedure for receiving or repeating the power according to the operation mode of the wireless power apparatus 500 will be described with reference to FIGS. 5 to 7.

FIG. 5 is a block view showing the wireless power apparatus 500 according to one embodiment of the disclosure, FIG. 6 is a view showing a power reception mode of the wireless power apparatus 500 according to one embodiment of the disclosure, and FIG. 7 is a view showing a power repeat mode of the wireless power apparatus 500 according to one embodiment of the disclosure.

Referring to FIG. 5, the wireless power apparatus 500 may include a reception resonant coil 510, a reception induction coil 520, a detecting unit 530, a switch unit 540, a rectifying unit 550 and a control unit 560.

The operation mode of the wireless power apparatus 500 can be changed into the power reception mode or the power repeat mode according to the detection of the wireless power receiver 300, the state information of the wireless power receiver 300, or the charge amount of power in the wireless power apparatus 500.

The reception resonant coil 510, the reception induction coil 520 and the rectifying unit 550 are the same as those shown in FIG. 1, so detailed description thereof will be omitted.

The detecting unit 530 can detect the existence of the wireless power receiver 300. That is, the detecting unit 530 can detect whether the wireless power receiver 300 is located within a power transmission region of the wireless power apparatus 500.

If the wireless power receiver 300 is located within the power transmission region of the wireless power apparatus 500, the control unit 560 requests the state information of the wireless power receiver 300 to the wireless power receiver 300.

Thus, the control unit 560 may receive the state information of the wireless power receiver 300 from the wireless power receiver 300. According to one embodiment, the state information of the wireless power receiver 300 may include information about the present charge amount of power and the change of the charge amount of power.

The request and reception of the state information can be performed through the in-band communication described with reference to FIG. 4.

If the present charge amount of power of the wireless power receiver 300 is less than a reference value, the control unit 560 changes the operation mode into the power repeat mode. According to one embodiment, in the power repeat mode, the power of the wireless power apparatus 500, which is received from the wireless power transmitter 200, is transferred to the wireless power receiver 300. That is, the wireless power apparatus 500 repeats the power in the power repeat mode. According to the embodiment, the reference value signifies the amount of power essentially required for the normal operation of the wireless power receiver 300.

However, the reference value may be limited thereto, but may vary depending on applications.

In addition, when the present charge amount of power of the wireless power apparatus 500 is less than the reference value, the control unit 560 may change the operation mode into the power reception mode.

Even when the existence of the wireless power receiver 300 is detected, if the charge amount of power in the wireless power apparatus 500 is less than the reference value, the controller 560 maintains the operation mode as the power reception mode without changing the operation mode into the power repeat mode.

Hereinafter, the above process will be described in detail with reference to FIGS. 2 and 3.

FIG. 6 shows the power reception mode of the wireless power apparatus 500. The power reception mode is for receiving the power from the wireless power transmitter 200. In this case, the controller 560 transmits the short-circuit signal to the switch unit 540 to connect the reception induction coil 520 with the rectifying unit 550. Therefore, the wireless power apparatus 500 receives the power from the wireless power transmitter 200 and transmits the power to the load 400. According to one embodiment, the switch unit 540 is disposed between the reception induction coil 520 and the rectifying unit 550.

FIG. 7 shows the power repeat mode of the wireless power apparatus 500. According to one embodiment, the wireless power apparatus 500 transfers the power received from the wireless power transmitter 200 to the wireless power receiver 300 in the power repeat mode. That is, the wireless power apparatus 500 repeats the power in the power repeat mode.

In this case, the controller 560 transmits the open signal to the switch unit 540 to disconnect the reception induction coil 520 from the rectifying unit 550. Therefore, the power received from the wireless power transmitter 200 may not be supplied to the load 400. In addition, if the wireless power receiver 300 is detected and the charge amount of power in the wireless power receiver 300 is less than the reference value, the wireless power apparatus 500 may transmit the power received from the wireless power transmitter 200 to the wireless power receiver 300. That is, the power transmission is achieved using the resonance between the reception resonant coil 510 of the wireless power apparatus 500 and the reception resonant coil 310 of the wireless power receiver 300.

FIG. 8 is a flowchart showing an operation method of the wireless power apparatus according to one embodiment of the disclosure.

Referring to FIG. 8, the wireless power apparatus 500 receives the power from the wireless power transmitter 200 (S101). That is, the wireless power apparatus 500 may operate identically to the wireless power receiver 300. The wireless power apparatus 500 may be located in the region where the wireless power apparatus 500 can receive the power from the wireless power transmitter 200 using resonance.

The wireless power apparatus 500 can detect the existence of the wireless power receiver 300 while receiving the power from the wireless power transmitter 200 (S103). According to one embodiment, the wireless power apparatus 500 can detect whether the wireless power receiver 300 is located within the power transmission region of the wireless power apparatus 500 by using the detecting unit 530. Various schemes can be utilized to detect the existence of the wireless power receiver 300.

If the existence of the wireless power receiver 300 is detected, the wireless power apparatus 500 requests the state information of the wireless power receiver 300 (S105). According to one embodiment, the state information of the wireless power receiver 300 may include information about the present charge amount in the wireless power receiver 300 and the change of the charge amount. According to one embodiment, the wireless power apparatus 500 and the wireless power receiver 300 can interchange the information through the in-band communication described with reference to FIG. 4. According to one embodiment, the wireless power apparatus 500 and the wireless power receiver 300 can interchange the information through an additional near field communication module.

Meanwhile, if the existence of the wireless power receiver 300 is not detected, the wireless power apparatus 500 continuously receives the power from the wireless power transmitter 200.

In response to the request for the state information, the wireless power apparatus 500 receives state information from the wireless power receiver 300 (S107).

If the charge amount of power in the state information is less than the reference value, the wireless power apparatus 500 changes the operation mode into the power repeat mode (S111). According to one embodiment, in the power repeat mode, the power of the wireless power apparatus 500, which is received from the wireless power transmitter 200, is transferred to the wireless power receiver 300. That is, the wireless power apparatus 500 repeats the power in the power repeat mode.

According to one embodiment, the operation mode can be changed into the power repeat mode by using the switch located between the reception induction coils 520 and 320 and the rectifying circuit. That is, if the charge amount of power in the wireless power receiver 300 is less than the reference value, the wireless power apparatus 500 opens the switch to change the operation mode into the power repeat mode.

In the power repeat mode, the wireless power apparatus 500 repeats the power between the wireless power transmitter 200 and the wireless power receiver 300 (S113).

Meanwhile, if the charge amount of power in the wireless power receiver 300 is higher than the reference value, the wireless power apparatus 500 changes the operation mode into the power reception mode (S115) and the process returns to step S101 so that the wireless power apparatus 500 receives the power from the wireless power transmitter 200.

In this manner, the wireless power apparatus 500 receives or repeats the power based on the state information of the wireless power receiver 300, so the power can be efficiently transmitted.

FIG. 9 is a flowchart showing an operation method of a wireless power apparatus according to another embodiment of the disclosure.

Referring to FIG. 9, the wireless power apparatus 500 receives the power from the wireless power transmitter 200 (S201). That is, the wireless power apparatus 500 may operate identically to the wireless power receiver 300. The wireless power apparatus 500 may be located in the region where the wireless power apparatus 500 can receive the power from the wireless power transmitter 200 using resonance.

The wireless power apparatus 500 can detect the existence of the wireless power receiver 300 while receiving the power from the wireless power transmitter 200 (S203). According to one embodiment, the wireless power apparatus 500 can detect whether the wireless power receiver 300 is located within the power transmission region of the wireless power apparatus 500 by using the detecting unit 530. Various schemes can be utilized to detect the existence of the wireless power receiver 300.

If the existence of the wireless power receiver 300 is detected, the wireless power apparatus 500 checks whether the charge amount of power in the wireless power apparatus 500 is higher than the reference value (S205).

If the charge amount of power in the wireless power apparatus 500 is higher than the reference value, the wireless power apparatus 500 changes the operation mode into the power repeat mode (S207). According to one embodiment, in the power repeat mode, the power of the wireless power apparatus 500, which is received from the wireless power transmitter 200, is transferred to the wireless power receiver 300. That is, the wireless power apparatus 500 repeats the power in the power repeat mode. According to one embodiment, the operation mode can be changed into the power repeat mode by using the switch located between the reception induction coils 520 and 320 and the rectifying circuit. That is, if the charge amount of power in the wireless power receiver 300 is less than the reference value, the wireless power apparatus 500 opens the switch to change the operation mode into the power repeat mode.

In the power repeat mode, the wireless power apparatus 500 repeats the power between the wireless power transmitter 200 and the wireless power receiver 300 (S209).

Meanwhile, if the wireless power receiver 300 is not detected, the wireless power apparatus 500 may continuously receive the power from the wireless power transmitter 200.

In addition, the charge amount of power in the wireless power apparatus 500 is less than the reference value, the operation mode is changed into the power reception mode (S211), so that the wireless power apparatus 500 receives the power from the wireless power transmitter 200.

In this manner, the wireless power apparatus 500 receives or repeats the power based on the charge amount of power in the wireless power apparatus 500, so the power can be efficiently transmitted.

Although a preferred embodiment of the disclosure has been described for illustrative purposes, those skilled in the art will appreciate that various modifications, additions and substitutions are possible, without departing from the scope and spirit of the invention as disclosed in the accompanying claims.

The invention claimed is:

1. A wireless power apparatus to repeat power between a wireless power transmitter and a wireless power receiver, the wireless power apparatus comprising:
   a resonant coil resonance-coupled with the wireless power transmitter to wirelessly repeat the power;
   an induction coil for transferring to a load of the wireless power apparatus a power generated through coupling the induction coil with the resonant coil;
   a detecting unit for detecting an existence of the wireless power receiver; and
   a control unit requesting state information of the wireless power receiver,
   wherein the wireless power apparatus operates in a power reception mode or a power repeat mode according to a result of a detection of the wireless power receiver,
   wherein in the power reception mode the power is supplied to the load and in the power repeat mode the power is transferred to the wireless power receiver,
   wherein the operation mode is changed according to the result of the detection of the wireless power receiver and the state information of the wireless power receiver,
   wherein the state information of the wireless power receiver includes information about a change amount of power in the wireless power receiver,
   wherein the wireless power apparatus changes the operation mode into the power repeat mode when the wireless power receiver is detected and the charge amount of power in the wireless power receiver is smaller than a reference value, and
   wherein the wireless power apparatus changes the operation mode into the power reception mode when the wireless power receiver is detected and the charge amount of power in the wireless power apparatus is greater than a reference value.

2. The wireless power apparatus of claim 1, further comprising a switch unit disposed between the induction coil and the load.

3. The wireless power apparatus of claim 2, wherein the wireless power apparatus changes an operation mode into the power repeat mode by opening the switch unit when the wireless power receiver is detected and a charge amount of power in the wireless power receiver is less than a reference value.

4. The wireless power apparatus of claim 2, wherein the wireless power apparatus changes an operation mode into the power reception mode by shortening the switch unit when the wireless power receiver is detected and a charge amount of power in the wireless power receiver is greater than a reference value.

5. A method of operating a wireless power apparatus to repeat power between a wireless power transmitter and a wireless power receiver, the method comprising:
   wirelessly receiving the power from the wireless power transmitter through resonance;
   detecting an existence of the wireless power receiver;
   requesting state information of the wireless power receiver; and
   changing an operation mode of the wireless power apparatus according to a detection result for the wireless power receiver,
   wherein the changing of the operation mode includes changing the operation mode according to the detection result and the state information of the wireless power receiver,
   wherein the state information of the wireless power receiver includes information of a charge amount of power in the wireless power receiver,
   wherein the changing of the operation mode includes changing the operation mode into a power repeat mode when the wireless power receiver is detected and the charge amount of power in the wireless power receiver is smaller than a reference value,
   wherein the changing of the operation mode includes changing the operation mode into a power reception mode when the wireless power receiver is detected and a charge amount of power in the wireless power apparatus is greater than a reference value,
   wherein in the power reception mode the power is supplied to a load of the wireless power apparatus, and
   wherein in the power repeating mode the power is repeated from the wireless power transmitter to the wireless power receiver.

6. The method of claim 5, wherein the wireless power apparatus includes a switch unit disposed between an induction coil and the load, and the changing of the operation mode includes changing the operation mode into a power repeat mode by opening the switch unit and changing the operation mode into a power reception mode by shortening the switch unit.

* * * * *